US010649779B2

(12) United States Patent
Ayub et al.

(10) Patent No.: US 10,649,779 B2
(45) Date of Patent: *May 12, 2020

(54) VARIABLE LATENCY PIPE FOR INTERLEAVING INSTRUCTION TAGS IN A MICROPROCESSOR

(71) Applicant: International Business Machines Corporation, Armonk, NY (US)

(72) Inventors: Salma Ayub, Austin, TX (US); Josh Bowman, Austin, TX (US); Sundeep Chadha, Austin, TX (US); Dhivya Jeganathan, Austin, TX (US); Cliff Kucharski, Austin, TX (US); Dung Q. Nguyen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 327 days.

This patent is subject to a terminal disclaimer.

(21) Appl. No.: 15/072,670

(22) Filed: Mar. 17, 2016

(65) Prior Publication Data

US 2017/0003971 A1 Jan. 5, 2017

Related U.S. Application Data

(63) Continuation of application No. 14/755,570, filed on Jun. 30, 2015.

(51) Int. Cl.
*G06F 9/38* (2018.01)
*G06F 1/10* (2006.01)
*G06F 9/30* (2018.01)

(52) U.S. Cl.
CPC .............. *G06F 9/3838* (2013.01); *G06F 1/10* (2013.01); *G06F 9/30145* (2013.01); *G06F 9/3836* (2013.01); *G06F 9/3851* (2013.01)

(58) Field of Classification Search
CPC ...... G06F 9/3838; G06F 1/10; G06F 9/30112; G06F 9/30145; G06F 9/3851; G06F 9/3873

See application file for complete search history.

(56) References Cited

U.S. PATENT DOCUMENTS 5,958,041 A * 9/1999 Petolino, Jr. ........ G06F 9/30043
712/214
9,652,246 B1 * 5/2017 Tam ...................... G06F 9/3861

(Continued)

OTHER PUBLICATIONS

IBM, "Method and Apparatus for Synchronization Between Out of Order Dispatched Instruction Stream and Execution Queue", IP.com, IPCOM000126022D, Jun. 28, 2005, 10 pages.

(Continued)

*Primary Examiner* — Eric Coleman
(74) *Attorney, Agent, or Firm* — Patterson + Sheridan, LLP

(57) ABSTRACT

Techniques disclosed herein describe a variable latency pipe for interleaving instruction tags in a processor. According to one embodiment presented herein, an instruction tag is associated with an instruction upon issue of the instruction from the issue queue. One of a plurality of positions in the latency pipe is determined. The pipe stores one or more instruction tags, each associated with a respective instruction. The pipe also stores the instruction tags in a respective position based on the latency of each respective instruction. The instruction tag is stored at the determined position in the pipe.

7 Claims, 5 Drawing Sheets

(56) References Cited

U.S. PATENT DOCUMENTS

| | | | |
|---|---|---|---|
| 2003/0196074 A1 | 10/2003 | Le et al. | |
| 2004/0221138 A1* | 11/2004 | Rosner | G06F 9/3802 |
| | | | 712/218 |
| 2006/0259741 A1 | 11/2006 | Hastie | |
| 2006/0277398 A1 | 12/2006 | Akkary et al. | |
| 2008/0222395 A1* | 9/2008 | Le | G06F 9/3824 |
| | | | 712/220 |
| 2009/0063735 A1* | 3/2009 | Ng | G06F 9/3824 |
| | | | 710/54 |
| 2009/0063823 A1* | 3/2009 | Burky | G06F 9/3838 |
| | | | 712/216 |
| 2010/0077181 A1* | 3/2010 | Abernathy | G06F 9/3824 |
| | | | 712/214 |
| 2010/0332804 A1* | 12/2010 | Golla | G06F 9/3838 |
| | | | 712/214 |
| 2010/0332806 A1 | 12/2010 | Golla et al. | |
| 2015/0363206 A1* | 12/2015 | Guo | G06F 9/3855 |
| | | | 712/214 |
| 2016/0041853 A1* | 2/2016 | Arekapudi | G06F 9/542 |
| | | | 718/102 |

OTHER PUBLICATIONS

Internet Society et al., "Direct Data Placement Protocol (DDP)/Remote Direct Memory Access Protocol (RDMAP) Security (RFC5042)", IP.com, IPCOM000159870D, Nov. 1, 2007, 54 pages.
List of IBM Patents or Applications Treated As Related.

\* cited by examiner

VARIABLE LATENCY PIPE FOR INTERLEAVING INSTRUCTION TAGS IN A MICROPROCESSOR

CROSS-REFERENCE TO RELATED APPLICATIONS

This application is a continuation of co-pending U.S. patent application Ser. No. 14/755,570, filed Jun. 30, 2015. The aforementioned related patent application is herein incorporated by reference in its entirety.

BACKGROUND

Embodiments presented herein generally relate to issuing instructions in a processor, and more specifically, to interleaving instruction tags in the processor.

A conventional superscalar processor may issue instructions out-of-order with respect to a predefined program order. Because subsequent instructions are often dependent upon results of previous instructions, an issue queue in the processor may use a dependency tracking scheme to ensure that all data dependencies are followed. For instance, in one approach, the processor manages dependencies using instruction tags. At issue of an instruction in a given clock cycle to a given execution unit, the processor associates the instruction with an instruction tag that uniquely identifies the instruction within the processor. Further, during the same cycle, an execution unit may broadcast the instruction tag to the issue queue. Doing so wakes up instructions that are dependent on the associated instruction (i.e., indicates that source operands for the dependent instructions are ready) and prepares the instructions for subsequent issue.

However, instructions stored in the issue queue can have different latencies. That is, a given instruction may take a certain number of cycles to produce resulting data depending on an underlying operation of the instruction (e.g., whether the instruction corresponds to an add operation, subtract operation, divide operation, etc.). Another instruction may take relatively greater or fewer cycles to complete. Further, the processor may include multiple execution units. As a result, the number of instruction tags broadcast to the issue queue can be quite large. Consequently, performance of the processor may be affected due to an increase in silicon usage and power consumption.

SUMMARY

One embodiment presented herein includes a method for issuing instructions in a processor. Upon issue of an instruction from an issue queue, an instruction tag is associated with the instruction. One of a plurality of positions in a pipe to store the instruction tag is determined. The plurality of positions is ordered from a head position to a tail position. The pipe stores one or more instruction tags each associated with a respective instruction. The pipe stores the one or more instruction tags in a respective position based on the latency of each of the respective instructions. The position of the instruction tag is determined based on a latency of the instruction relative to the latency of each of the respective instructions. The instruction tag is stored at the determined position in the pipe.

BRIEF DESCRIPTION OF THE SEVERAL VIEWS OF THE DRAWINGS

So that the manner in which the above recited features, advantages, and objects of the present disclosure are attained and can be understood in detail, a more particular description of the present disclosure, briefly summarized above, may be had by reference to the embodiments thereof which are illustrated in the appended drawings.

Note, however, that the appended drawings illustrate only typical embodiments of the present disclosure and are therefore not to be considered limiting of its scope, for the present disclosure may admit to other equally effective embodiments.

DETAILED DESCRIPTION

Figure 1:
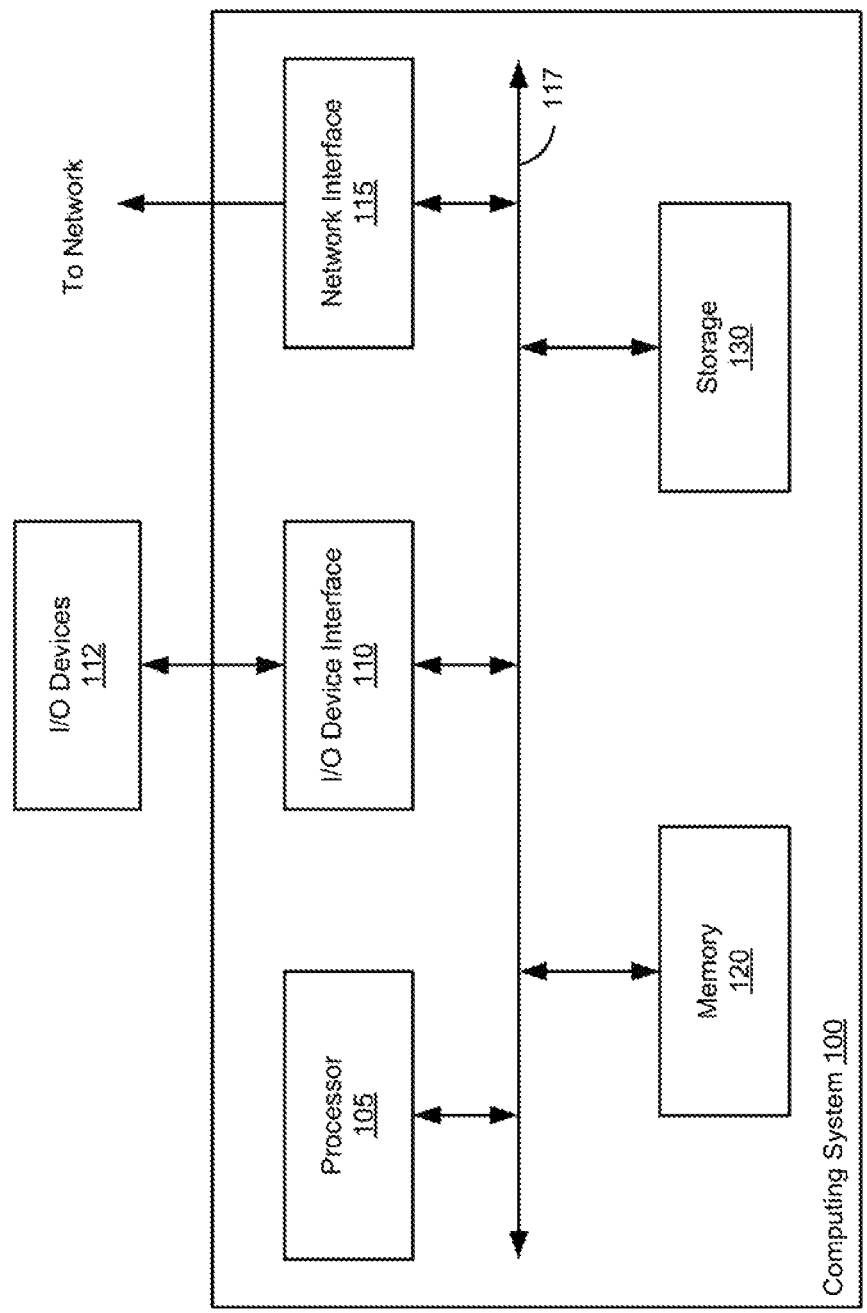
FIG. 1 illustrates an example computing system, according to one embodiment.

Embodiments presented herein describe techniques for issuing instructions in a processor. More specifically, the techniques described herein provide a variable latency pipe for storing instruction tags associated with instructions issued from an issue queue. The latency pipe is a data structure that stores instruction tags associated with a given instruction based on clock cycle latency.

In one embodiment, the latency pipe writes the instruction tag at a position determined based on a clock cycle latency of the instruction relative to latencies of other issued instructions, which each have instruction tags stored in the latency pipe based on the latency. Further, the latency pipe releases an instruction tag for broadcast within the processor at each clock cycle from the tail of the pipe. That is, an instruction tag associated with an instruction having a given latency is released from the pipe before another instruction tag associated with an instruction having a higher latency.

In one embodiment, at issue of a given instruction, the processor associates the instruction with an instruction tag that distinctly identifies the instruction within the processor. Further, the processor determines a latency of the instruction. Generally, each instruction entered in the issue queue may be encoded with latency bits that indicate the number of cycles that the instruction requires for execution. For example, a simple add operation may take two cycles to produce a result. The latency bits encoded in the instruction reflects the two cycles needed.

Once determined, the latency pipe writes the instruction tag at an index that matches the latency of the instruction. As stated, the latency pipe releases an instruction tag for broadcast at each clock cycle. The determined placement of the instruction tag in the latency pipe allows the instruction tag to flow out of the pipe when a result is produced by the corresponding execution unit. The processor may broadcast the instruction tag to the issue queue consuming facilities such as the issue queue, rename logic, and finish logic. For instance, broadcasting the instruction tag to the issue queue wakes up instructions that are dependent to the associated instruction, i.e., indicates to a given dependent instruction that source operands relied on by the dependent instruction is ready.

Advantageously, storing instruction tags in a latency pipe streamlines broadcast of the instruction tags to consuming facilities such as the issue queue. As a result, the latency pipe may reduce silicon usage and power consumption by managing flow of the instruction tags in the processor. Further, storing the instruction tags by latency of associated instructions allows the instruction tags to be interleaved with one another based on instruction latency. For example, after an issue queue issues an instruction X having a latency N, subsequent instructions can be issued with associated instruction tags being placed in front or behind the instruction tag of instruction X.

FIG. 1 illustrates an example computing system 100 that includes a processor 105 configured to store instruction tags in a variable latency pipe, according to one embodiment. As shown, the computing system 100 further includes, without limitation, a network interface 115, a memory 120, and a storage 130, each connected to a bus. The computing system 100 may also include an I/O device interface 110 connecting I/O devices 112 (e.g., keyboard, display, and mouse devices) to the computing system 100. Further, in context of the present disclosure, the computing system 100 is representative of a physical computing system, e.g., a desktop computer, laptop computer, etc. Of course, the computing system 100 will include a variety of additional hardware components.

The processor 105 retrieves and executes programming instructions stored in the memory 120 as well as stores and retrieves application data residing in the storage 130. The bus 117 is used to transmit programming instructions and application data between the processor 105, I/O device interface 110, network interface 115, memory 120, and storage 130. The memory 120 is generally included to be representative of a random access memory. The storage 130 may be a combination of fixed and/or removable storage devices, such as fixed disc drives, removable memory cards, or optical storage, network attached storage (NAS), or a storage-area network (SAN).

Figure 2:
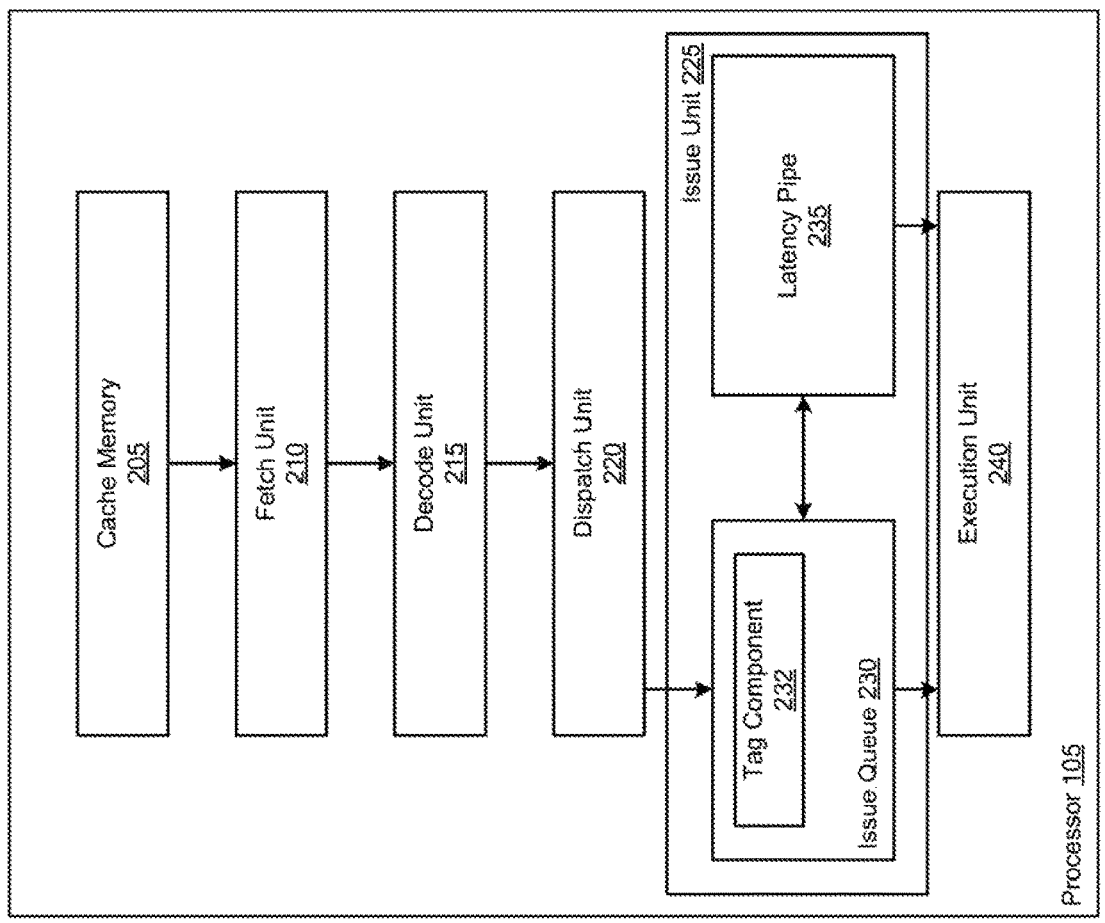
FIG. 2 illustrates an example processor, according to one embodiment.

FIG. 2 further illustrates the processor 105, according to one embodiment. As shown, the processor 105 includes a cache memory 205, a fetch unit 210, a decode unit 215, a dispatch unit 220, an issue unit 225, and an execution unit 240. Of course, the processor 105 may include additional components not shown in FIG. 2. The cache memory 205 may receive processor instructions from the memory 120, storage 130, network interface 115, or other sources not shown.

The cache memory 205 connects with the fetch unit 210. The fetch unit 210 fetches multiple instructions from the cache memory 205. Instructions may be in the form of an instruction stream that includes a series or a sequence of instructions. The fetch unit 210 connects with the decode unit 215. The decode unit 215 decodes instructions as resources of the processor 105 become available. The decode unit 215 connects with a dispatch unit 220. The dispatch unit 220 connects with the issue unit 225. In one embodiment, the dispatch unit 220 dispatches one or more instructions to the issue unit 225 during a processor 105 clock cycle.

As shown, the issue unit 225 includes an issue queue 230 and a latency pipe 235. The issue queue 230 includes an instruction data store that stores issue queue instructions. For example, an issue queue that stores twenty-four instructions uses an instruction data store with twenty-four storage locations. The issue queue 230 may include an age array that tracks relative age data for each instruction within the instruction data store. The issue queue 230 may also include instruction select logic that determines which of the stored instructions to issue at a given clock cycle. For example, the issue selection logic may prioritize older instructions that have been previously rejected (e.g., due to collisions with other issuing instructions) to issue over younger instructions in the issue queue 230. The issue unit 225 connects with an execution unit 240. The execution unit 240 may include multiple execution units that execute instructions from the issue queue 230 or other instructions.

In one embodiment, the issue queue 230 includes a tag component 232. At issue of a given instruction during a clock cycle, the tag component 232 associates an instruction tag with that instruction. The instruction tag uniquely identifies the instruction within the processor 105. The execution unit 240 may broadcast the instruction tag to other consuming facilities of the processor 105. For example, the execution unit 240 may broadcast the instruction tag to instructions stored in the issue queue 230. In turn, each instruction can evaluate the instruction tag to determine dependencies that the instruction may have to the instruction associated with the instruction tag. If a given instruction is dependent on that instruction, the instruction wakes up for potential subsequent issue. As another example, the execution unit 240 may broadcast the instruction tag to a completion logic in the processor 105 to indicate that the underlying instruction has finished execution.

Because clock cycle latency can vary between instructions stored in the issue queue 230, and because multiple execution units 240 may broadcast instruction tags during each clock cycle, managing instruction tags presents several challenges (e.g., in minimizing power consumption, silicon usage, etc.). To address these challenges, in one embodiment, the latency pipe 235 manages instruction tags of issued instructions. The latency pipe 235 is an N-entry data structure that stores one or more instruction tags. The latency pipe 235 may also store thread and type information associated with the instruction.

Further, the latency pipe 235 stores each instruction tag based on a latency of the instruction associated with the instruction tag. The latency pipe 235 writes the instruction tag at an index that matches the latency of the associated instruction. Further still, at each subsequent clock cycle, the latency pipe 235 shifts each stored instruction tag down a position and releases the instruction tag at the tail of the latency pipe 235. As a result, the instruction tag is released during the clock cycle that the associated instruction completes execution. The latency pipe 235 outputs the instruction tag to a broadcast multiplexor. The broadcast multiplexor may broadcast the instruction tag to consuming facilities (e.g., the issue queue 230, completion logic, rename logic, etc.). Generally, the instruction tag is broadcast two cycles before register write-back.

In one embodiment, instruction tags associated with single-cycle instructions may bypass the latency pipe 235. That is, at issue of a single-cycle instruction, the tag component 232 associates an instruction tag with the instruction and outputs the instruction tag directly to the broadcast multiplexor. Doing so avoids the extra clock cycle incurred by storing and subsequently releasing the instruction tag in the latency pipe 235 while the instruction has completed execution. Further, the execution unit 240 may prioritize execution of multi-cycle instructions over single-cycle instructions in the event of conflict between such instructions in the execution pipeline.

As stated, the latency pipe 235 is a fixed N-entry data structure that stores instruction tags based on latency of underlying instructions. The latency pipe 235 can store instruction tags associated with instructions having up to a N clock cycle latency. Of course, instructions may exceed N clock cycles. In such a case, at issue of an instruction that exceeds N clock cycles, the tag component 232 may write the associated instruction tag to a side register of the issue unit 225 (not shown). The instruction tag may remain in the side register until the associated instruction is at a N clock cycle latency (e.g., after a certain amount of clock cycles). The latency pipe 235 removes the instruction tag from the side register and stores the instruction tag at a position in the latency pipe 235 based on the current clock cycle latency of the associated instruction.

Figure 3:
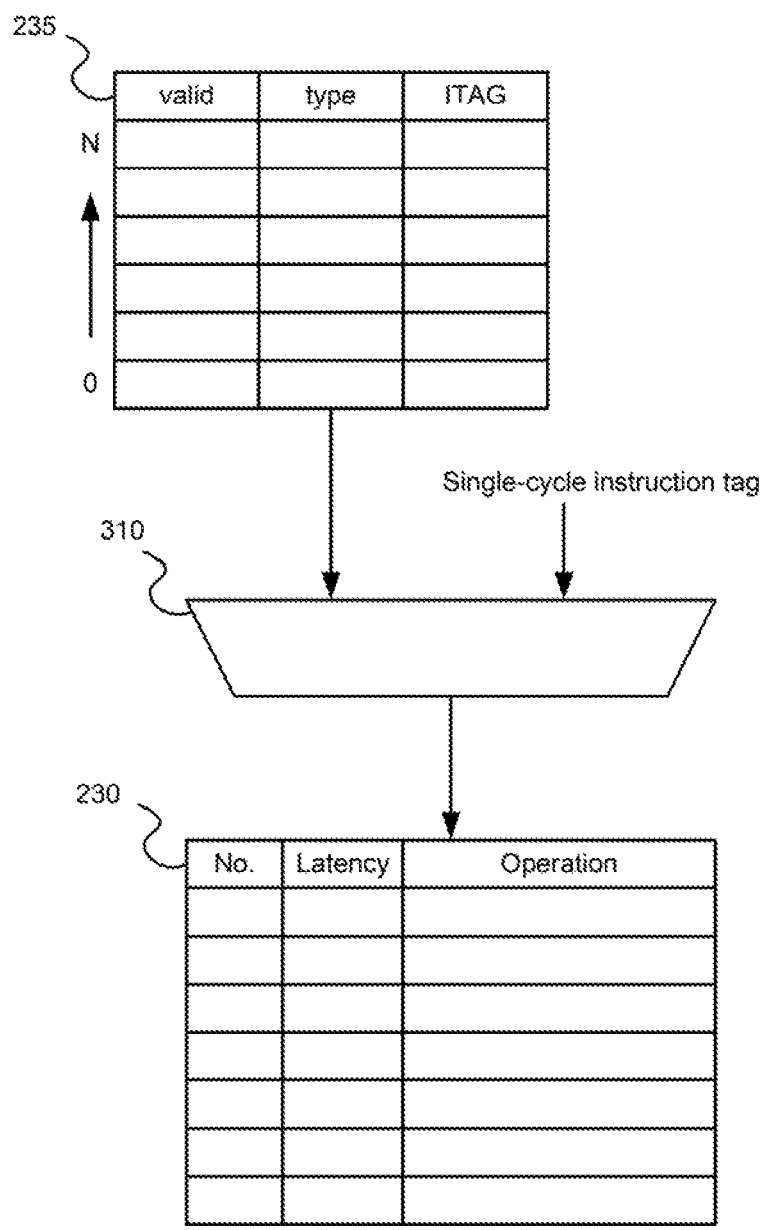
FIG. 3 illustrates a flow diagram of an interaction between an issue queue and a variable latency pipe in a processor, according to one embodiment.

FIG. 3 further illustrates the issue queue 230 and the latency pipe 235 in the processor 105, according to one embodiment. Illustratively, the issue queue 230 stores instructions for issue. Each stored instruction may include information such as program number, clock cycle latency, and operations. Of course, instructions may include other information such as a valid bit field, register pointers, end-of-operation bits, and the like. The issue queue 230 may be of a fixed size.

Illustratively, the latency pipe 235 stores instruction tags associated with instructions issued from the issue queue 230. Each stored instruction tag may include information such as a valid bit, type (e.g., store instruction, load instruction, etc.), and instruction tag identifier. Of course, the instruction tag may include other information associated with the underlying instruction, such as thread information. Illustratively, the latency pipe 235 is structured in descending order by latency, with the head of the pipe 235 being position N and the tail of the pipe 235 being position 0.

At each clock cycle, the latency pipe 235 releases the instruction tag stored at position 0 and shifts the other stored instruction tags down by one position. Further, the latency pipe 235 feeds the instruction tag to a broadcast multiplexor 310. In one embodiment, the broadcast multiplexor 310 broadcasts the instruction tag to a variety of consuming facilities, such as the issue queue 230, as depicted. As stated, the broadcast multiplexor 310 may also broadcast the instruction tag to other units of the processor 105, such as to a completion logic to indicate that the instruction has executed. The broadcast multiplexor 310 may also broadcast to a register rename logic.

As stated, instruction tags associated with single-cycle instructions may bypass storage in the latency pipe 235. When such an instruction issues, the tag component 232 feeds the associated instruction tag directly to the broadcast multiplexor 310. In one embodiment, the execution unit 240 may include logic that prioritizes multi-cycle instructions over single-cycle instructions in event of a conflict. For example, the logic may reject the single-cycle instruction and re-issue the instruction in a later clock cycle.

Figure 4:
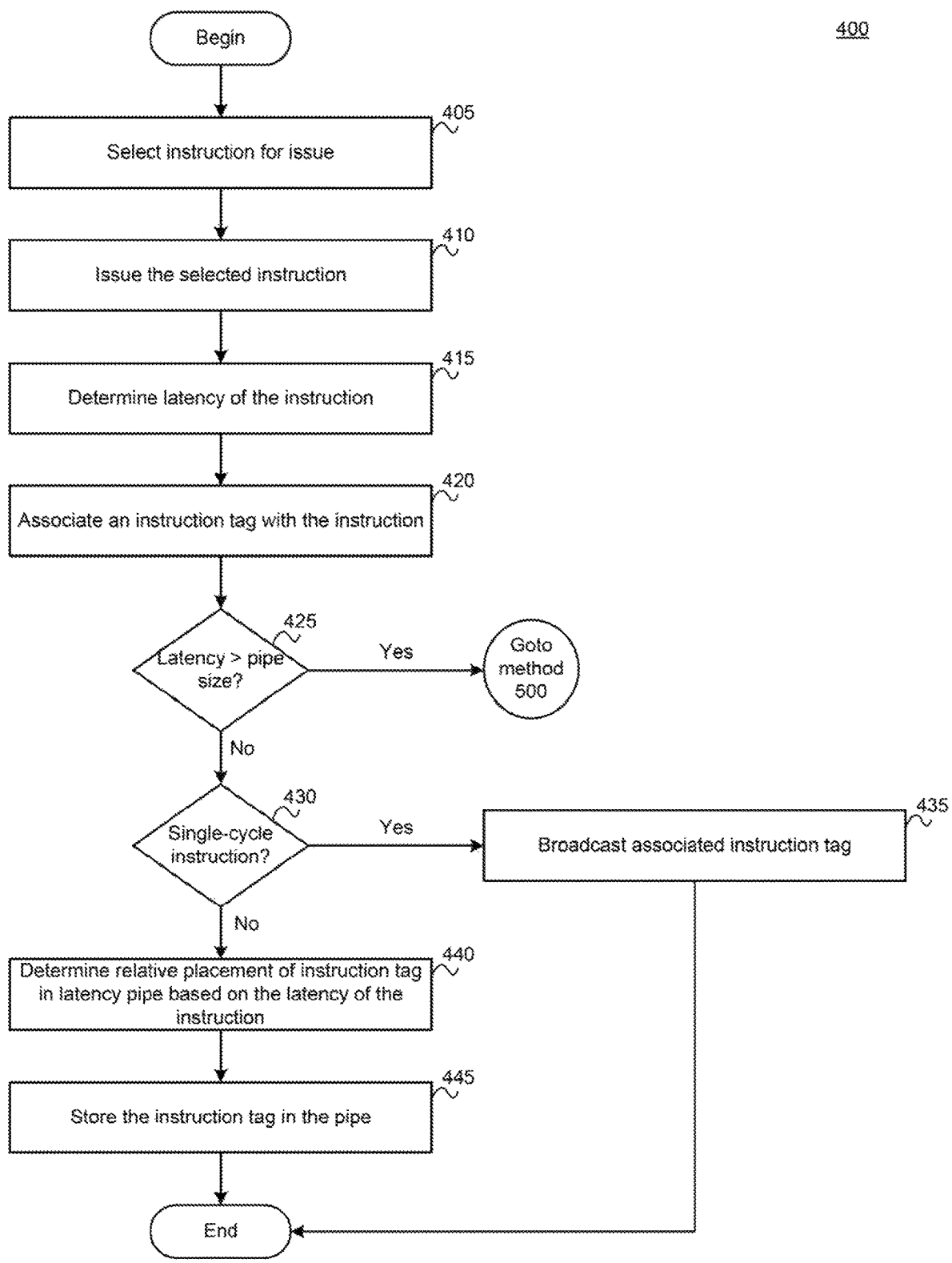
FIG. 4 illustrates a method for interleaving instruction tags in a latency pipe, according to one embodiment.

FIG. 4 illustrates a method 400 for interleaving instruction tags in a latency pipe based on latency of the underlying instructions, according to one embodiment. As shown, method 400 begins at step 405, where the instruction select logic selects an instruction for issue to one of the execution units 240. At step 410, the instruction select logic issues the instruction from the issue queue 230.

At step 415, the issue unit 225 determines the clock cycle latency of the issued instruction. As stated, the clock cycle latency may be encoded in the underlying instruction. For example, an add operation may take two clock cycles to produce a result. Latency bits may be encoded in the instruction to reflect the two cycles.

At step 420, the tag component 232 associates an instruction tag with the instruction. The instruction tag uniquely identifies the instruction within the processor 105. At step 425, the latency pipe 235 determines whether the latency of the issued instruction is greater than the size of the pipe 235. If so, then the latency pipe 235 is currently unable to store the instruction tag in any position of the pipe 235. In such a case, the tag component 232 may store the instruction tag in a side register that will hold the instruction tag until the associated instruction reaches a latency that allows the instruction tag to be stored in the pipe 235. Method 500 carries out this process and is described relative to FIG. 5.

Otherwise, at step 430, the latency pipe 235 determines whether the instruction is a single-cycle latency instruction. In such a case, the instruction tag bypasses storage in the latency pipe 235. Instead, the tag component 232 feeds the instruction tag into the broadcast multiplexor 310. If the instruction is a multi-cycle instruction, then at step 440, the latency pipe 235 determines the relative placement of the instruction tag in the latency pipe 235 based on the latency of the instruction. As stated, the latency pipe 235 writes a given instruction tag to an index that corresponds to the instruction latency. At step 445, the latency pipe 235 stores the instruction tag in the determined index position. As a result, the instruction tag may be interleaved with instruction tags of prior issued instructions, where each of the prior issued instructions have a latency either greater to or less than the latency of the current instruction.

Figure 5:
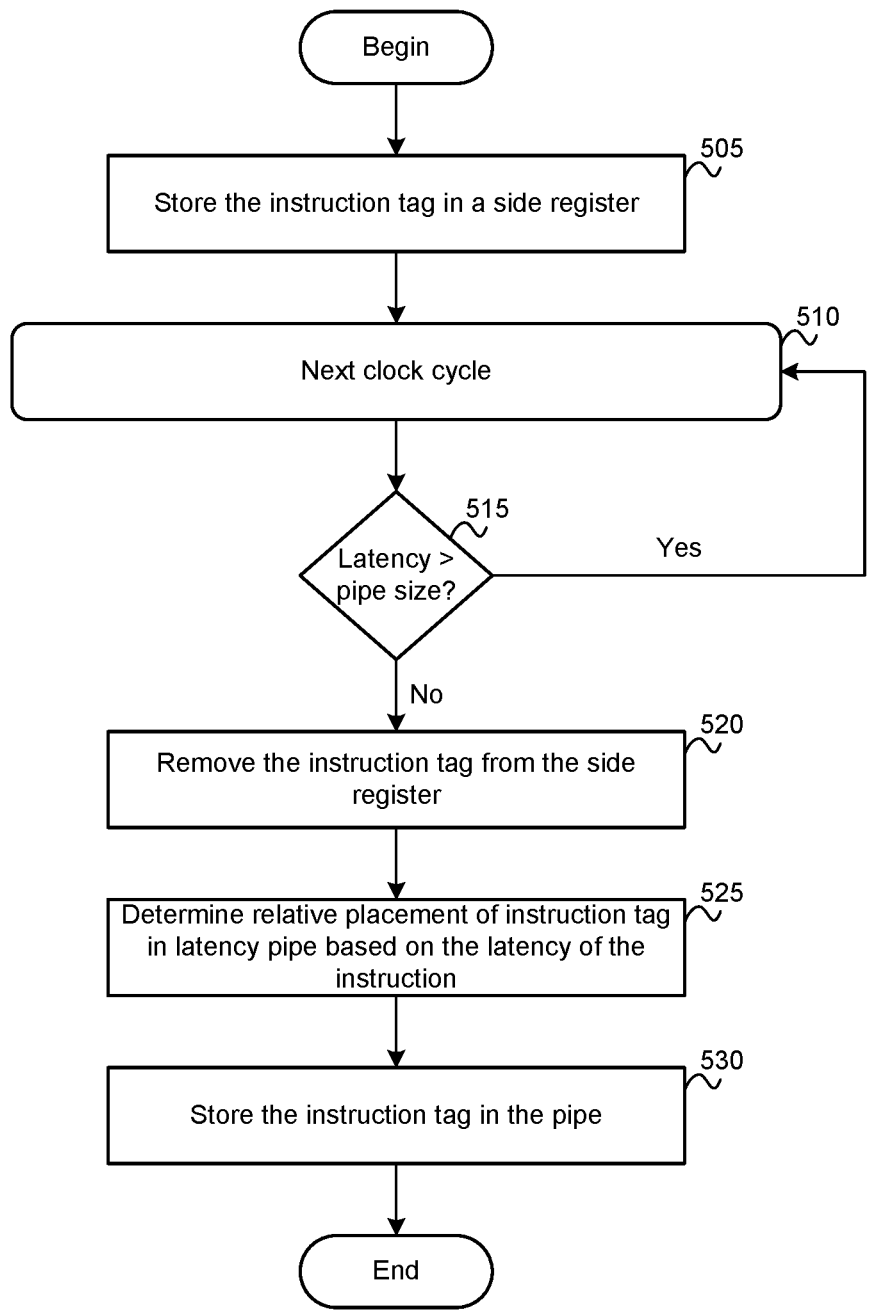
FIG. 5 illustrates a method for inserting an instruction tag in a latency pipe, where the instruction tag corresponds to an instruction having a multi-cycle latency that is larger than a size of the latency pipe, according to one embodiment.

FIG. 5 illustrates a method 500 for inserting an instruction tag in the latency pipe 235, where the instruction tag corresponds to an instruction having a multi-cycle latency that is larger than a size of the latency pipe, according to one embodiment. Method 500 continues from step 425, where the latency pipe 235 determines that the clock cycle latency of the instruction is greater than the size of the pipe 235.

At step 505, the tag component 232 stores the instruction tag in a side register of the issue unit 225. At step 510, the processor 105 continues to the next clock cycle. At the next clock cycle, the instruction latency decrements by one clock cycle. At step 515, the latency pipe 235 evaluates the instruction tag stored in the side register and determines whether the clock cycle latency is still greater than the size of the pipe 235. If so, then the processor continues to the next clock cycle.

If the latency is not greater than the size of the pipe 235, then at step 520, the latency pipe 235 removes the instruction tag from the side register. At step 525, the latency pipe 235 determines a relative placement of the instruction tag in the latency pipe 235 based on the latency of the instruction. Once determined, then at step 530, the latency pipe 235 writes the instruction tag in the determined index position.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments presented herein. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments presented herein. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the present disclosure may be devised without departing from the basic scope thereof, and the scope thereof is determined by the claims that follow.

What is claimed is:

1. A method for issuing instructions in a processor, comprising:
   upon issue of a first instruction from an issue queue configured to store a plurality of instructions, associating the first instruction with a first instruction tag of a plurality of instruction tags;
   identifying a predetermined latency of the first instruction, based on one or more predetermined latency bits included in the first instruction;
   determining a first position of a plurality of positions in a pipe to store the first instruction tag based on the predetermined latency, the plurality of positions being ordered from a head position to a tail position, the pipe storing one or more instruction tags each associated with a respective instruction, the pipe storing the plurality of instruction tags separately from the plurality of instructions stored in the issue queue, wherein the pipe stores each of the plurality of instruction tags in a respective position based on the predetermined latency of each respective instruction, and wherein the position of the instruction tag being determined based on a predetermined latency of the instruction relative to the predetermined latency of each respective instruction;
   storing the first instruction tag at the determined first position in the pipe;
   identifying a second instruction tag stored at the tail position in the pipe;
   broadcasting the second instruction tag to at least the issue queue, wherein the issue queue issues a second instruction upon receiving the instruction tag;
   removing the second instruction tag from the pipe after broadcast;
   upon issue of a third instruction from the issue queue, associating the third instruction with a third instruction tag;
   identifying a predetermined latency of the third instruction, based on one or more predetermined latency bits included in the third instruction, wherein the predetermined latency of the third instruction is shorter than the predetermined latency of the first instruction;
   determining a second position of the plurality of positions in the pipe to store the third instruction tag based on the predetermined latency of the third instruction, wherein the second position in the pipe is nearer to the tail position than the first position in the pipe is; and
   storing the third instruction tag at the determined second position in the pipe.

2. The method of claim 1, wherein the broadcasted instruction tag wakes up an instruction in the issue queue that is dependent on an instruction associated with the broadcasted instruction tag.

3. The method of claim 1, wherein the broadcasted instruction tag indicates to a completion logic that an instruction associated with the broadcasted instruction tag has executed.

4. The method of claim 1, wherein each of the one or more instruction tags has a latency of at most a specified amount of clock cycles.

5. The method of claim 4, further comprising:
storing, into a register, a fourth instruction tag associated with a fourth instruction having a latency that exceeds the specified amount of clock cycles.

6. The method of claim 5, further comprising:
upon the latency of the fourth instruction reaching the specified amount of clock cycles, storing the fourth instruction tag at a second determined position in the pipe.

7. A method for issuing instructions in a processor, comprising:
upon issue of a first issued instruction from an issue queue, associating the first issued instruction with a first instruction tag of a plurality of instruction tags, wherein each one of the plurality of instruction tags comprises a valid bit, an operand type, an instruction tag identifier, and thread information, and wherein the issue queue includes an age array that tracks the relative age of each un-issued instruction in the issue queue, and wherein the issue queue is configured to store a plurality of un-issued instructions, wherein the plurality of un-issued instructions comprises at least three non-identical operand types;
identifying a predetermined latency of the first issued instruction, based on one or more predetermined latency bits included in the first issued instruction, wherein the predetermined latency bits indicate a number of clock cycles required for execution of the first issued instruction;
determining a first position of a plurality of positions in a pipe to store the first instruction tag based on the predetermined latency, the plurality of positions being ordered from a head position to a tail position, the pipe storing a plurality of instruction tags each associated with a respective issued instruction, the pipe storing the plurality of instruction tags separately from the plurality of un-issued instructions stored in the issue queue, wherein the pipe stores each of the plurality of instruction tags in a respective position based on the predetermined latency of each respective issued instruction, wherein the position of the instruction tag being determined is based on a predetermined latency of the issued instruction relative to the predetermined latency of each respective issued instruction, and wherein an instruction tag associated with a single-cycle issued instruction bypasses the latency pipe;
storing the first instruction tag at the determined first position in the pipe;
identifying a second instruction tag stored at the tail position in the pipe;
broadcasting one of the plurality of instruction tags from the tail position of the pipe at each clock cycle, wherein at one clock cycle the second instruction tag is broadcast to at least the issue queue, a renaming unit, and a completion unit;
upon receiving the second instruction tag, issuing a second issued instruction based on information from the age array and information from the second instruction tag such that multi-cycle instructions are prioritized over single-cycle instructions in the event of a conflict, and such that issuing the second issued instruction prioritizes older un-issued instructions in the issue queue whose dependencies correspond to one of the plurality instruction tags that has already been broadcast;
removing the second instruction tag from the pipe after broadcast of the second instruction tag;
shifting the plurality of instruction tags towards the tail position of the pipe at each clock cycle;
upon issue of a third issued instruction from the issue queue, associating the third issued instruction with a third instruction tag;
identifying a predetermined latency of the third issued instruction, based on one or more predetermined latency bits included in the third instruction, wherein the predetermined latency of the third issued instruction is shorter than the predetermined latency of the first issued instruction, and wherein the predetermined latency bits indicate a number of clock cycles required for execution of the third issued instruction;
determining a second position of the plurality of positions in the pipe to store the third instruction tag based on the predetermined latency of the third issued instruction, wherein the second position in the pipe is nearer to the tail position than is the first position in the pipe; and
storing the third instruction tag at the determined second position in the pipe.

* * * * *